(12) United States Patent
Lauther et al.

(10) Patent No.: US 6,636,800 B1
(45) Date of Patent: Oct. 21, 2003

(54) METHOD AND DEVICE FOR COMPUTER ASSISTED GRAPH PROCESSING

(75) Inventors: Ulrich Lauther, München (DE); Reinhard Enders, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/530,317

(22) PCT Filed: Oct. 7, 1998

(86) PCT No.: PCT/DE98/02965

§ 371 (c)(1),
(2), (4) Date: Apr. 27, 2000

(87) PCT Pub. No.: WO99/22205

PCT Pub. Date: May 6, 1999

(30) Foreign Application Priority Data

Oct. 27, 1997 (DE) .......................................... 197 47 401

(51) Int. Cl.⁷ ............................................. G06F 15/173
(52) U.S. Cl. ...................................... 701/202; 709/239
(58) Field of Search .................................. 701/200, 201, 701/202; 345/418; 707/239, 240, 242, 241, 220, 238

(56) References Cited

U.S. PATENT DOCUMENTS 6,262,976 B1 * 7/2001 McNamera ................. 709/220

FOREIGN PATENT DOCUMENTS

DE 195 13 960 A1 10/1996
DE 196 06 010 A1 8/1997
EP 0 504 854 A1 9/1992

OTHER PUBLICATIONS

Jung et al., "HiTi Graph Model of Topographical Road Maps in Navigation Systems", pp. 76–84.
Liu et al., "Using Knowledge about the Road Network for Route Finding", pp. 306, 312.
Cherkassky et al., "Shortest Paths Algorithms: Theory and Experimental Evaluation".
Schöner Fahren, pp. 163–167.
Röbke–Doerr, "Pfad–Finder", pp. 118–119.

* cited by examiner

*Primary Examiner*—Richard M. Camby
(74) *Attorney, Agent, or Firm*—Staas & Halsey LLP

(57) ABSTRACT

Nodes of a graph are grouped into at least two regions. The following steps are implemented for each region and for at least some of the nodes of the respective region:
  a) one node is selected as a root node;
  b) a tree of shortest paths is determined for the root node in the graph having the a root node as root of the tree;
  c) a node of an edge of the graph is marked for the region when, proceeding from the node to the root node, the edge is contained in a shortest path to the root node.

18 Claims, 13 Drawing Sheets

| Edge | Region 1 | | Region 2 | | Region 3 | |
|---|---|---|---|---|---|---|
| (v,w) | v | w | v | w | v | w |
| a b |   | X |   |   |   |   |
| a c |   | X |   |   |   |   |
| b d |   | X |   |   |   |   |
| c b |   |   |   |   |   |   |
| c e |   | X |   |   |   |   |
| c g |   | X |   |   |   |   |
| d e |   |   |   |   |   |   |
| d f |   |   |   |   |   |   |
| e f |   | X |   |   |   |   |
| e g |   |   |   |   |   |   |
| e h |   |   |   |   |   |   |
| h g | X |   |   |   |   |   |

| Edge (v,w) | Region 1 v | Region 1 w | Region 2 v | Region 2 w | Region 3 v | Region 3 w |
|---|---|---|---|---|---|---|
| a b | X | | | | | |
| a c | | | | | | |
| b d | | X | | | | |
| c b | X | | | | | |
| c e | | X | | | | |
| c g | | X | | | | |
| d e | | | | | | |
| d f | | | | | | |
| e f | | X | | | | |
| e g | | | | | | |
| e h | | | | | | |
| h g | X | | | | | |

| Edge (v,w) | Region 1 | | Region 2 | | Region 3 | |
|---|---|---|---|---|---|---|
| | v | w | v | w | v | w |
| a b | | | X | | | |
| a c | | | | | | |
| b d | | | X | | | |
| c b | | | | | | |
| c e | | | X | | | |
| c g | | | | | | |
| d e | | | | X | | |
| d f | | | | X | | |
| e f | | | | | | |
| e g | | | | X | | |
| e h | | | | X | | |
| h g | | | | | | |

| Edge (v,w) | Region 1 v | Region 1 w | Region 2 v | Region 2 w | Region 3 v | Region 3 w |
|---|---|---|---|---|---|---|
| a b | | | | | | |
| a c | | | X | | | |
| b d | | | | | | |
| c b | | | | X | | |
| c e | | | X | | | |
| c g | | | | | | |
| d e | | | | | | |
| d f | | | X | | | |
| e f | | | X | | | |
| e g | | | | X | | |
| e h | | | | X | | |
| h g | | | | | | |

| Edge (v,w) | Region 1 | | Region 2 | | Region 3 | |
|---|---|---|---|---|---|---|
| | v | w | v | w | v | w |
| a b | | | | | | |
| a c | | | | | X | |
| b d | | | | | | |
| c b | | | | | | X |
| c e | | | | | | |
| c g | | | | | X | |
| d e | | | | | X | |
| d f | | | | | | |
| e f | | | | | | X |
| e g | | | | | X | |
| e h | | | | | | |
| h g | | | | | X | |

| Edge | Region 1 | | Region 2 | | Region 3 | |
|---|---|---|---|---|---|---|
| (v,w) | v | w | v | w | v | w |
| a b | | | | | | |
| a c | | | | | | X |
| b d | | | | | | |
| c b | | | | | | X |
| c e | | | | | | |
| c g | | | | | | X |
| d e | | | | | | X |
| d f | | | | | | |
| e f | | | | | | X |
| e g | | | | | | |
| e h | | | | | X | |
| h g | | | | | | X |

| Edge (v,w) | Region 1 v | Region 1 w | Region 2 v | Region 2 w | Region 3 v | Region 3 w |
|---|---|---|---|---|---|---|
| a b | X | X | X | | | |
| a c | X | X | X | | X | |
| b d | | X | X | | | |
| c b | X | X | | X | | X |
| c e | | X | X | | | |
| c g | | X | | | X | |
| d e | X | | X | X | X | |
| d f | | | X | X | | |
| e f | | X | X | X | | X |
| e g | | | | X | X | |
| e h | | | | X | X | |
| h g | X | | | | X | X |

METHOD AND DEVICE FOR COMPUTER ASSISTED GRAPH PROCESSING

BACKGROUND OF THE INVENTION

1. Field of the Invention

The Present invention is directed to a computer-assisted processing of a graph that comprises nodes and edges.

2. Description of the Related Art

A fast, computer-assisted determination of the shortest paths in directed or undirected graphs is required in the greatest variety of computer-assisted applications.

A number of methods for determining shortest paths are known for this purpose. An overview of known methods, for example the Moore/Pape method or of the Dijkstra algorithm as well, may be found in B. V. Cherkassky et al., Shorest Path Algorithm, Theory and Experimental Evaluation. A corresponding method, however, includes the disadvantage that nearly all nodes of the graph must be taken into consideration given start and destination nodes lying far apart in order to identify the shortest path between a prescribed starting part and a prescribed destination point.

H. P. Canibol and E. Muller, Schoner fahren, focus and P. Robke-Doerr, Pfad-Finder disclose a computer-assisted navigation system in a motor vehicle. Maps are stored in a memory of the navigation system, whereby individual locations on the map (for example, houses, railroad stations, points of interest, etc.) are represented by nodes of a graph. The connections between the locations (streets, paths, etc.) are represented by edges of the graph. The shortest or, respectively, fastest path between the starting position and the target position is determined in the navigation system for a predetermined starting position and a predetermined target position upon employment of a method for determining shortest paths.

DE 195 13 960 A1 discloses a method for imaging a graph in a memory on the basis of a plurality of depth and width searches in differing direction.

DE 196 06 010 A1 discloses a location data bank for the determination of routes within a traffic route network.

What is to be understood below by a shortest path is the cheapest path under a predetermined cost function on the edges of a graph (for example, geographical length, anticipated travel time, etc.)

The known navigation system exhibits the disadvantage that an optimized route, i.e. the shortest path between the starting position and the target position, can only be determined given extremely high calculating outlay, so that considerable computer performance must be made available given a fast processing of an order for route determination, as a result whereof the navigation system is rather expensive.

In some applications, an extremely great number of shortest paths must be identified in a predetermined network, as a result whereof the criterion of a fast determination of shortest paths acquires even significantly more significance.

Given centralized systems, a central server must service a plurality of inquires for route determination from a plurality of client navigation systems and must be able to rapidly determine a great number of shortest paths for this purpose.

SUMMARY OF THE INVENTION

The present invention is thus based on the problem of processing a graph that comprises nodes and edges such that a determination of a shortest path becomes possible faster than is possible with known methods.

The problem is solved by the method for computer-assisted processing of a graph that has nodes and edges, whereby the graph describes a structure of a technical system, whereby the nodes are grouped into at least two regions, whereby the following steps are implemented for each region and for at least some of the nodes of the region;
a) one node is selected as root node;
b) a tree of shortest paths is determined for the root node in the graph with the root node as root of the tree;
c) a node of an edge of the graph is marked for the region when, proceeding from the node to the root node, the edge is contained in a shortest path to the root node.

The invention also provides an arrangement for computer-assisted processing of a graph that has nodes and edges, having a processor unit that is configured such that the nodes are grouped into at least two regions;

the following steps are implemented for each region and for at least some of the nodes of the region:
a) one node is selected as root node;
b) a tree of shortest paths is determined for the root node in the graph having the root node as root of the tree;
c) a node of an edge of the graph is marked for the region when, proceeding from the node to the root node, the edge is contained in a shortest path to the root node.

A graph that comprises nodes and edges is processed in the method. The nodes of the graph are grouped into at least two regions. The following steps are implemented for each region and for at least some of the nodes:
a) one node is selected as a root node;
b) a tree of shortest paths in the graph with the the root node as root of the tree is determined for the root node;
c) a node of an edge of the graph is then marked for the region when, proceeding from the node to the root node, the edge is contained in a shortest path to the root node.

The arrangement for processing a graph that comprises nodes and edges contains a processor unit that is configured such that the following steps are implemented for each region and for at least some of the nodes of the region that are grouped into at least two regions:
a) a node is selected as the root node;
b) a tree of shortest paths in the graph with the root node as the root of the tree is determined for the root node;
c) a node of an edge of the graph is marked for the region when, proceeding from the node to the root node, the edge is contained in a shortest path to the root node.

The shortest path can be contained in the tree of shortest paths or can be contained in a further shortest path to the root node that is not in the tree of shortest paths.

Due to this extremely simple type of pre-processing of a graph, a considerable enhancement of the determination speed of a shortest path is achieved in the determination of shortest paths in the processed graph.

Any desired method for determining shortest paths, for example the Moore/Pape method or the Dijkstra algorithm as well in the respective application, bidirectionally and well, with or without target alignment via remaining path length estimation or any other method for determining shortest paths can be utilized for calculating the shortest paths in the respective application as well as in the pre-processing, i.e. in the method for processing the graph.

The substantial saving in calculating time in the determination of shortest paths as a result of the pre-processing of the invention also makes it possible to equip the navigation system with substantially less computer power, so that the costs of the navigation system can be substantially reduced.

Developments of the invention provide that the method steps a) through c) are implemented for all nodes of the respective region. The marking ensues by allocation of a binary value to the node in the edge of the respective region. The nodes are grouped into a plurality of regions in one embodiment. In a preferred development, a shortest path between a predetermined starting node and a predetermined target node is determined upon employment of the marked nodes. Specifically, the following steps are implemented for determining the shortest path between the starting node and the target node: a starting region is determined and stored, the starting node being grouped thereto; a target region is determined and stored, the target node being grouped thereto; only those edges are taken into consideration in the determination of the shortest path proceeding from the starting node for which the following is valid; a first node of the edge is marked for the target region proceeding from the starting node in the starting region, and a second node of the edge is marked for the starting region proceeding from the starting node in the starting region. In further detail, the following steps are implemented for the determination of the shortest path between the starting node and the target node: only those edges for which the following applies are taken into consideration in the determination of the shortest path proceeding from the target node: a first node of the edge is marked for the starting region proceeding from the target node in the target region, and a second node of the edge is marked for the target region proceeding from the target node in the target region. The method may be utilized for determining roots between a starting location and a target location of a digitalized map in a computer-assisted navigation system, whereby the content of the map is described by the graphs. In one embodiment, the Moore/Pape method is utilized for the determination of a shortest path.

The apparatus of the invention is also further defined, wherein the processor unit is configured such that the method steps a) through c) are implemented for all nodes of the respective region. The processor unit is configured such that the marking ensues by allocation of a binary value to the node in the edge of the respective region. The processor unit is configured such that the nodes are grouped into a plurality of regions. The processor unit is configured such that a shortest path between a predetermined starting node and a predetermined target node is determined upon employment of the marked nodes.

In one embodiment, the processor unit is configured such that the following steps are implemented for determining the shortest path between the starting node and the target node: a starting region is determined and stored, the starting node being grouped thereto; a target region is identified and stored, the target node being grouped thereto; only those edges for which the following applies are taken into consideration in the determination of the shortest path proceeding from the starting node: a first node of the edge is marked for the target region proceeding from the starting node in the starting region, and a second node of the edge is marked for the starting region proceeding from the starting node in the starting region. The processor unit is configured such that the following steps are implemented for determining the shortest path between the starting node and the target node: only those edges for which the following is valid are taken into consideration in the determination of the shortest path proceeding from the target node: a first node of the edge is marked for the starting region proceeding from the target node in the target region, and a second node of the edge is marked for the target region proceeding from the target node in the target region. For determining a shortest path between a starting node and a target node in a graph that comprises nodes and edges, the graph describes a structure of a technical system, a processor unit being provided in said arrangement that is configured such that the shortest path is determined upon employment of graphs that are processed according to the following steps: the nodes are grouped into at least two regions; the following steps are implemented for each region and for at least some of the nodes of the region: a) one node is selected as a root node; b) a tree of shortest paths is determined for the root node in the graph having the root node as a root of the tree; c) a node of an edge of the graph is marked for the region when, proceeding from the node to the root node, the edge is contained in a shortest path to the root node. A digitalized map is employed, whereby the content of the map is described by a graph with nodes and edges; whereby the processed graph is employed for determining routes between a starting location and a destination location.

It is advantageous in one development of the method and of the arrangement to determine a shortest path between a predetermined starting node and a predetermined target node upon employment of the marked nodes, i.e. upon employment of the processed graph. A method for determining shortest paths with which a substantially faster determination of the shortest path is achieved is recited on the basis of this development.

In a further development of the invention, it is advantageous that the following steps are implemented for the determination of the shortest path between the starting node and the target node:

a starting region is identified and stored, the starting node being grouped thereto;

a target region is determined and stored, the target node being grouped thereto;

only those edges are taken into consideration for the determination of the shortest path proceeding from the starting node and/or proceeding from the destination node for which the following is valid:

proceeding from the starting node and/or proceeding from the target node in the starting region and/or in the target region, a first node of the edge is marked for the target region and/or for the starting region, and proceeding from the starting node and/or proceeding from the target node in the starting region and/or in the target region, a second node of the edge is marked for the starting region and/or for the target region.

A considerable saving of calculating time in the determination of shortest paths is achieved as a result of this procedure. It should thereby be noted that the pre-processing is implemented only once dependent on the number of inquiries or—if it should react to modified traffic situations (traffic jams, blocked streets, etc.), is implemented at regular intervals.

BRIEF DESCRIPTION OF THE DRAWINGS

An exemplary embodiment of the invention is shown in the figures and is explained in greater detail below.

DETAILED DESCRIPTION OF THE PREFERRED EMBODIMENTS

Figure 1:
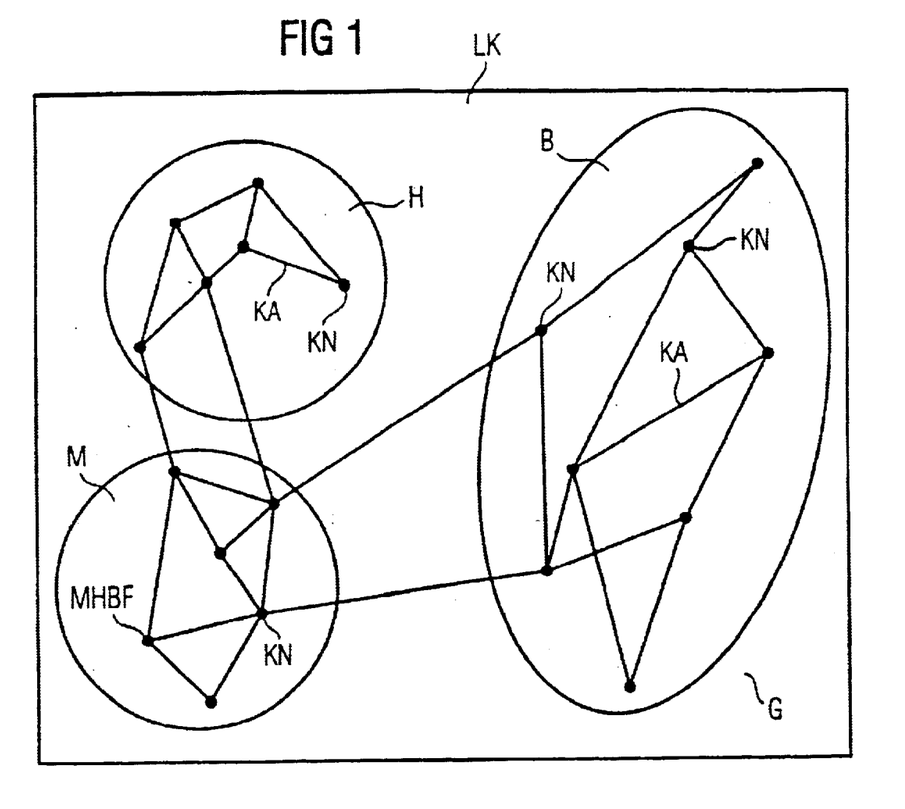
FIG. 1 is a sketch of a map whose content is represented by a graph having nodes and edges.

FIG. 1 shows a map LK whose content is represented by a graph G having nodes KN and edges KA. The nodes KN of the graph G represent positions within the map, buildings, points of interest, etc. The edges KA represent streets, which are generally connections between the positions on the map LK. The nodes KN are grouped into three regions H, M, B, a first region M that represents the municipal area of Munich, a second region H that represents the municipal area of Hamburg, as well as a municipal region B that represents the city of Berlin.

Figure 2:
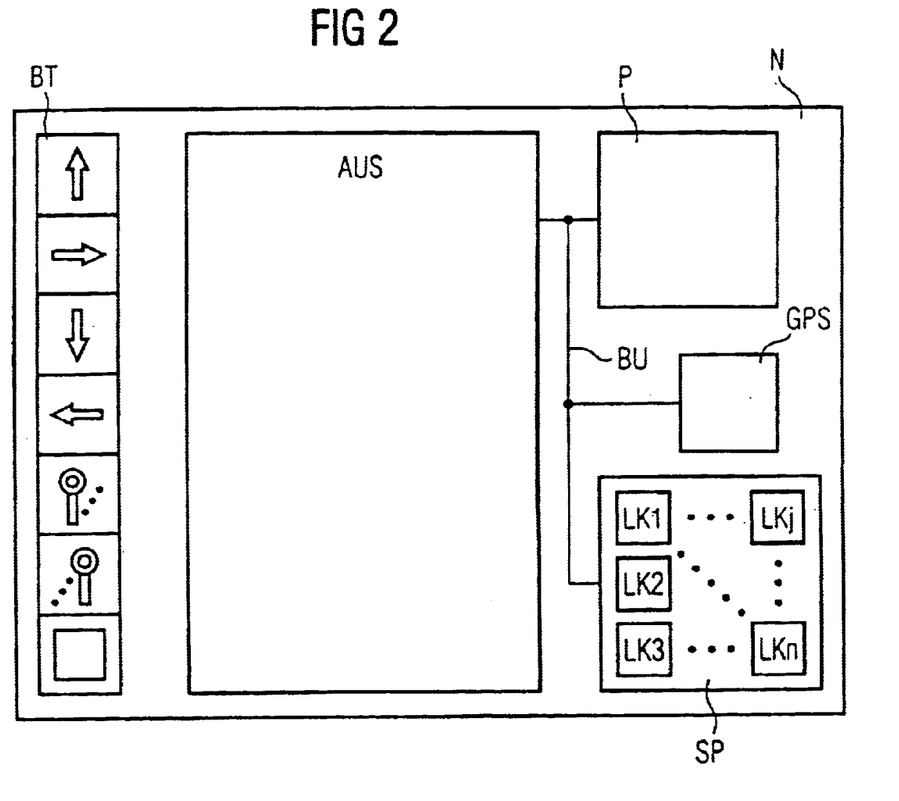
FIG. 2 is a block diagram of a navigation system.

FIG. 2 shows a sketch of a navigation system N. The navigation system N comprises a control panel BT, a display unit AUS, a processor unit P, a bus BU, a GPS system (Global Position System) as well as a memory SP.

The navigation system N is operated with the control panel BT.

A map LKj (j=1 . . . n) and/or a directional indication for a route to be traveled is displayed for the user of the navigation system N on the display unit AUS.

Both the display unit AUS as well as the processor P, the GPS System GPS as well as the memory SP are connected to one another via a bus BU.

The maps LKj are stored in digital form in the memory SP. The maps LKj can also be stored on other storage media that are not directly integrated in the navigation system N, for example a CD-ROM.

Figure 3:
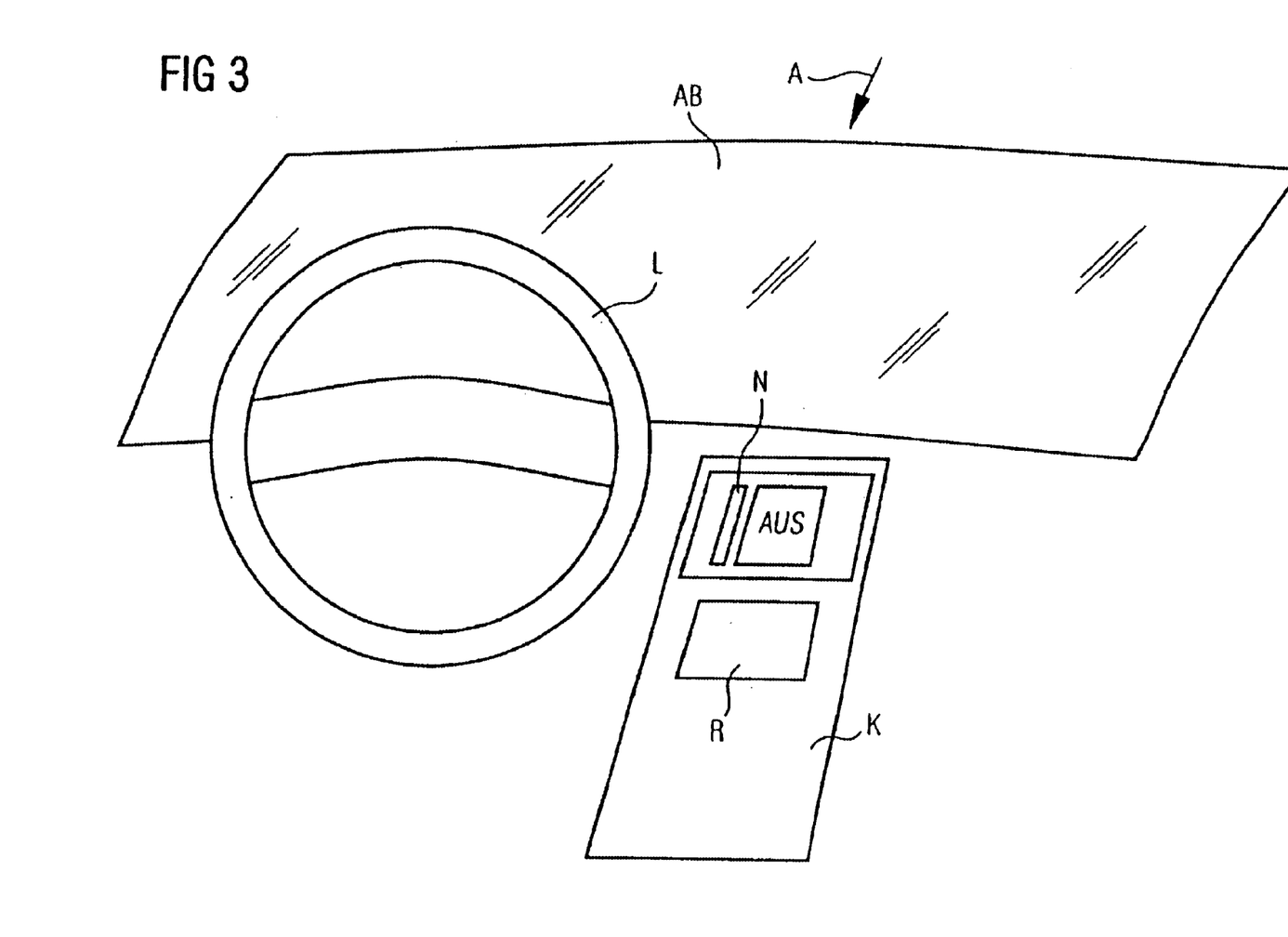
FIG. 3 is a perspective view of a cockpit of a motor vehicle wherein a navigation system is provided.

The navigation system N is installed in a cockpit A of a motor vehicle. The cockpit A comprises a steering wheel L, a dashboard AB as well as a console K. The navigation system N is integrated in the console K, just like a radio R.

A desired starting position and a desired target position within the map LKj are prescribed by the user of the navigation system N via the control panel BT, the user wishing to have the most optimum route determined for these positions. The route determination is based on a method for determining shortest paths in the graph G that represents the content of the map LKj.

A considerable acceleration of the actual determination of shortest paths in the graph G is achieved by a pre-processing of the graph G.

The pre-processing of the graph G occurs according to the following method steps:

The nodes KN of the graph G are grouped into an arbitrary number of regions M, H, B. The regions represent a logically interconnected set of positions within the map LKj.

Each node KN of the graph G is grouped to exactly one region M, H or B.

Given 1 regions (k=1, . . . , 1; 1 denotes the number of regions contained in the map LKj), 2*1 markings are determined for each edge KN ((v, w)) of the graph G. The marking ensues with a binary value.

A first node value vflag[i] of a node v of the respective edge (v, w) is set to a first binary value, i.e. the node v is marked, when and only when there is a shortest path from the node v that uses the edge (v, w) and leads into a target region i. A second node value wflag[i] is set when and only when there is a shortest path proceeding from the node w that employs the edge (v, w) and leads into the target region i.

2*k bits per edge are thus required for storing all markings.

The determination of the edge values is explained in yet greater detail below.

A graph G having a plurality of regions into which the nodes KN are grouped contains two types of edges:

internal edges whereat both nodes of the edge lie in the same region; and external edges whereat the nodes of the edge lie in different regions.

Nodes that are incident to external edges are referred to as exported nodes.

A simple procedure for determining the node values is as follows:

```
1. Erase all flags;
2. For each region i {
      for each exported node r of the region i {
         calculated the tree of shortest paths having the root r;
         For each edge (v, w) of the tree having the length 1 (v, w) {
            Determine distances d(v) and d(w) of the nodes v and w
            from the node r;
            If d(w) = d(v) + 1 (v, w), set vflag[i];
         }
      }
   }
```

A node is respectively selected as a root node for at least some of the nodes and a tree of shortest paths for the graph G having the respectively current root node is determined in the graph G with the root node. The first node value vflag[i] is set to the first binary value for all edges (v, w) that are contained in the respective tree of shortest paths or lie in another shortest path to the root node—this can be directly read from the distances d(v) and d(w) of the nodes v and w from the node r. This means that a conclusion as to whether the respective edge is contained in a different shortest path to the root node can be made based on the distances in the tree.

Any known algorithm for determining shortest paths can be utilized for determining the trees of shortest paths. The method of Moore/Pape has proven advantageous.

Figure 13A:
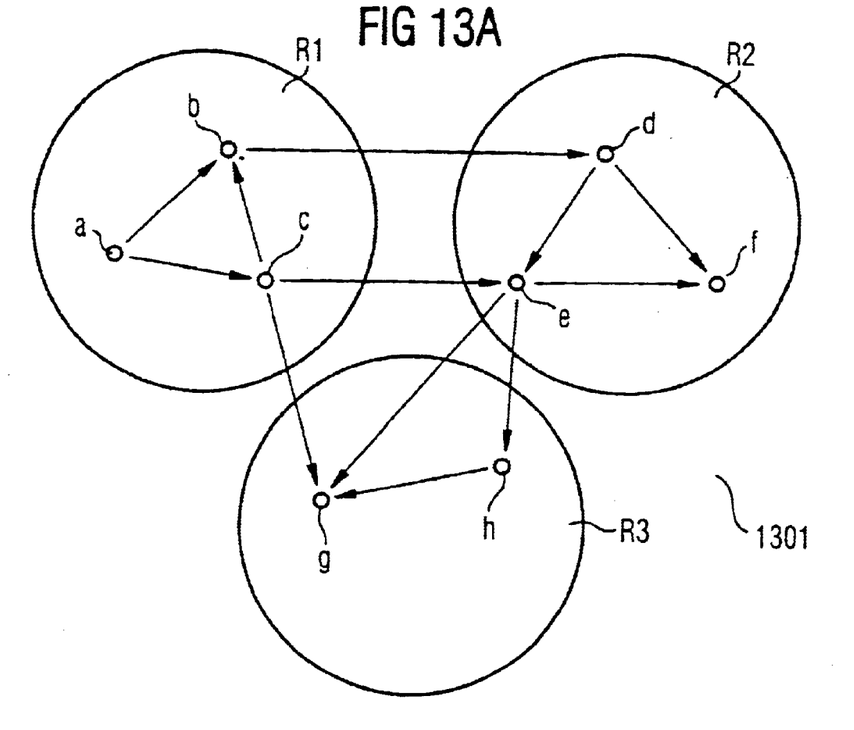
FIGS. 13a and 13b are the graph (FIG. 13a) and a table having the edges of the graph and the regions and the corresponding markings of the nodes of the edges for the respective region that derives overall according to the method (FIG. 13b).

For a simpler illustration of the above-described method, the method is explained with reference to a Graph 1301 that is shown in FIG. 13a. The Graph 1301 comprises 8 nodes a, b, c, d, e, f, g, h. The 8 nodes are grouped into three regions R1, R2, R3. A first region R1 contains the nodes a, b, c; a second region R2 contains the nodes d, e, f; and a third region R3 contains the nodes g and h.

The Graph 1301 is likewise indicated in FIGS. 5a, 6a, 7a, 8a, 9a, 10a, 11a and 12a. Compared to the Graph 1301, however, shortest paths having the respective root node are also respectively shown for a node of the Graph 1301 as a selected root node.

Figure 5A:
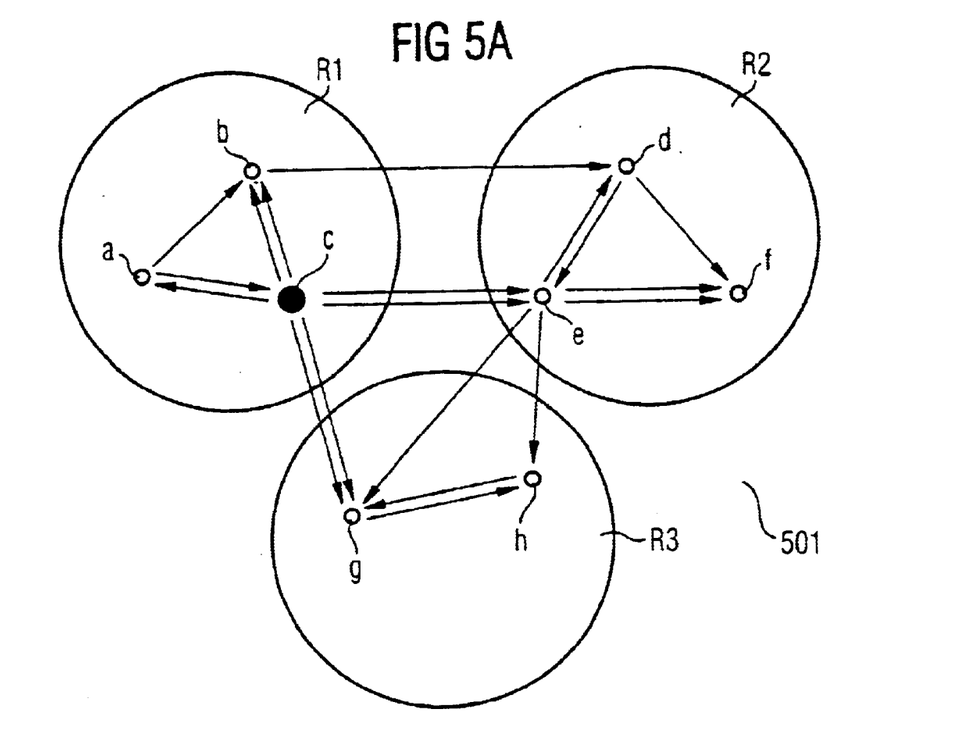
FIGS. 5a and 5b are a graph having a tree of shortest paths proceeding from the node c (FIG. 5a) and a table of the appertaining marking of the nodes with respect to the respective edges of the graph in the region 1 (FIG. 5b)

A tree of shortest paths 501 having the root node c is shown in FIG. 5a. A tree of shortest paths is respectively shown in the graph on the basis of a second connection between the nodes of the Graph 1301.

A table is respectively shown in FIGS. 5b, 6b, 7b, 8b, 9b, 10b, 11b, 12b for the tree of shortest paths of the respectively corresponding FIGS. 5a, 6a, 7a, 8a, 9a, 10a, 11a and 12a. The edges (v, w) of the Graph 1301 are recited in a first column of the table.

Figure 5B:
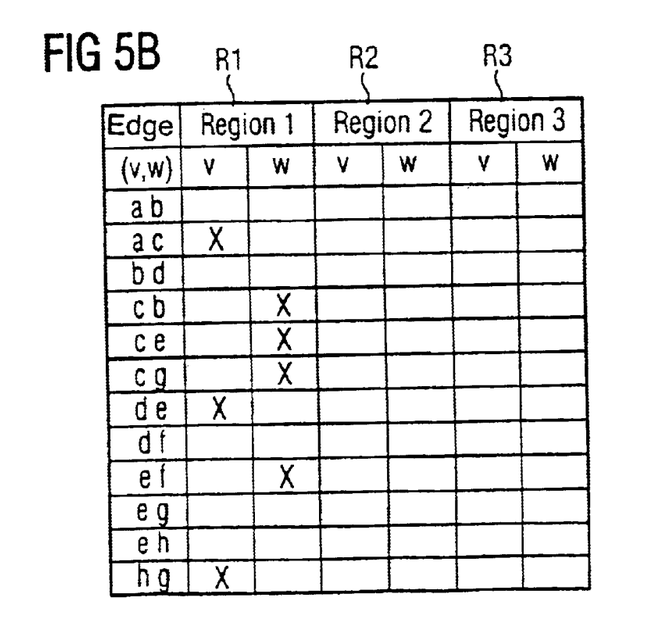

Further, the regions R1, R2, R3 are shown in three main columns. Two columns v, w that represent the first node value or, respectively, second node value of the respective edge (v, w) in the region R1, R2, R3 are respectively contained in each main column R1, R2, R3.

A first node value in a field that is unambiguously referenced by an edge (v, w) and a main column and a column in a main column is shown with a cross in the respective field. A first node value is then marked when, proceeding from the node of the edge (v, w), a shortest path leads to the root node c that contains the respective edge (v, w).

The edge (a, b) is contained in a shortest path to the root node c in the first region R1. No marking is thus set for the edge (a, b) for this tree of shortest paths 501.

It is determined for the edge (a, c) that the edge (a, c) is contained in the tree of shortest paths 501 with the root node c. Proceeding from the node a, a shortest path having the edge (a, c) leads to the root node c. The node a is thus marked for the first region R1, since the target region is the first region R1.

The edge (b, d) is not contained in the tree of shortest paths 501 having the root node c. What applies to the edge (c, b) is that, proceeding from the node b, a shortest path having the edge (c, b) leads to the root node c. The node b is thus marked for the first region R1.

The analogous case applies to the edges (c, e) and (c, g). What applies to the edge (d, e) is that, proceeding from the node d, there is a shortest path to the root node c with the edges (d, e) and (c, e). The edge (d, e) is thus contained in the shortest path, and the node d is marked for the edge for the first region R1.

The analogous applies to the node f of the edge (e, f) and the node h in the edge (h, g).

Figure 6A:
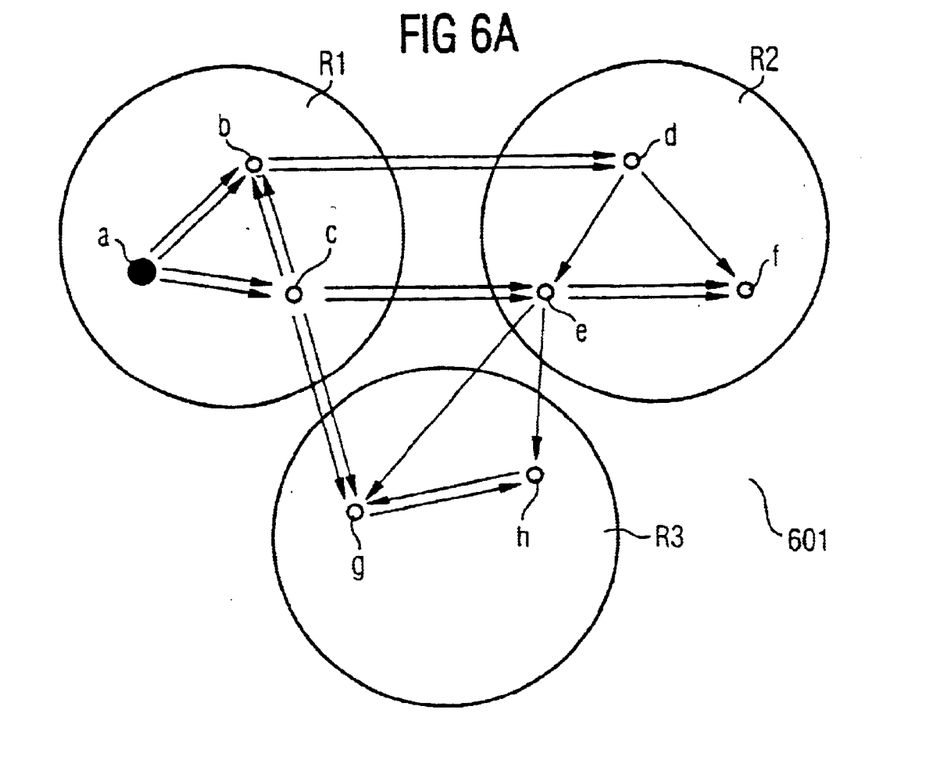
FIGS. 6a and 6c are a graph having a tree of shortest paths proceeding from the node a (FIG. 6a) and a table of the appertaining marking of the nodes with respect to the respective edges of the graph in the region a (FIG. 6b)
Figure 6B:
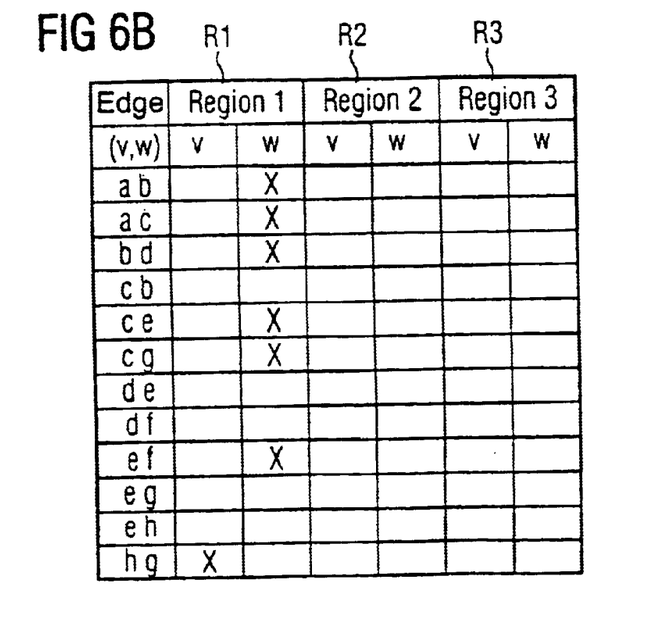

The same method is implemented for a tree of shortest paths 601 having a root node a, shown in FIG. 6a, this leading to the table shown in FIG. 6b.

Figure 7A:
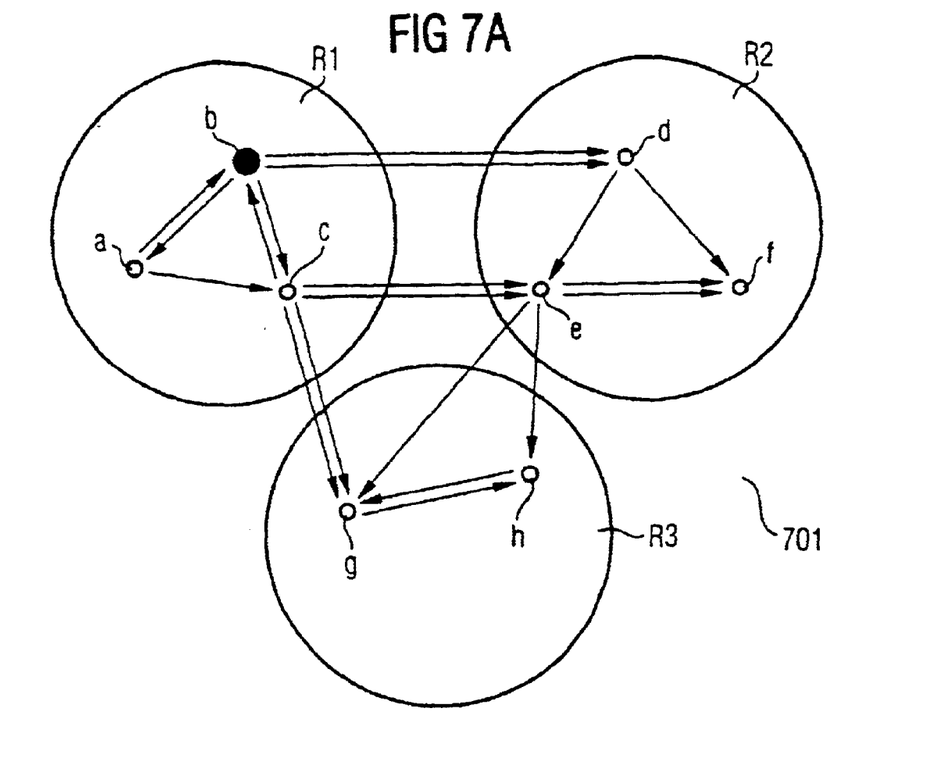
FIGS. 7a and 7b are a graph having a tree of shortest paths proceeding from the node b (FIG. 7a) and a table of the appertaining marking of the nodes with respect to the respective edges of the graph in the region 1 (FIG. 7b)
Figure 7B:
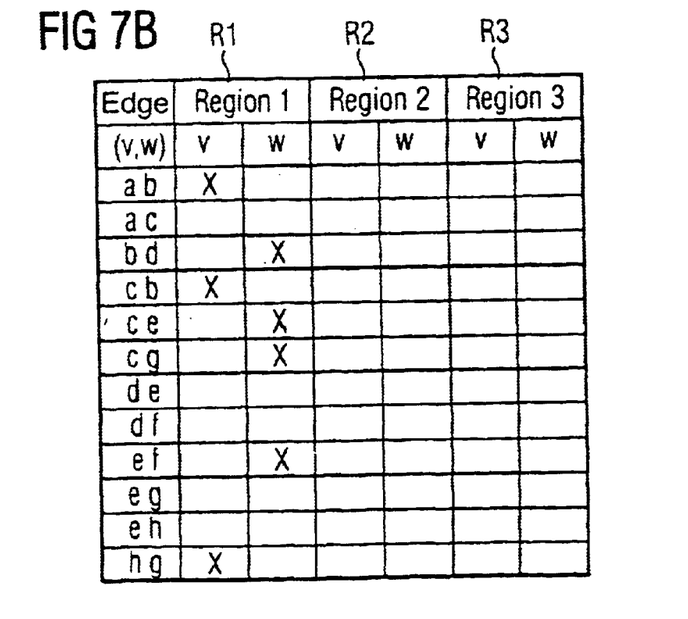

A tree of shortest paths 701 with the root node b is shown in FIG. 7a, and the appertaining markings for the first region R1 for the respective edges with respect to the tree of shortest paths 701 having the root node b is shown in FIG. 7b.

Figure 8A:
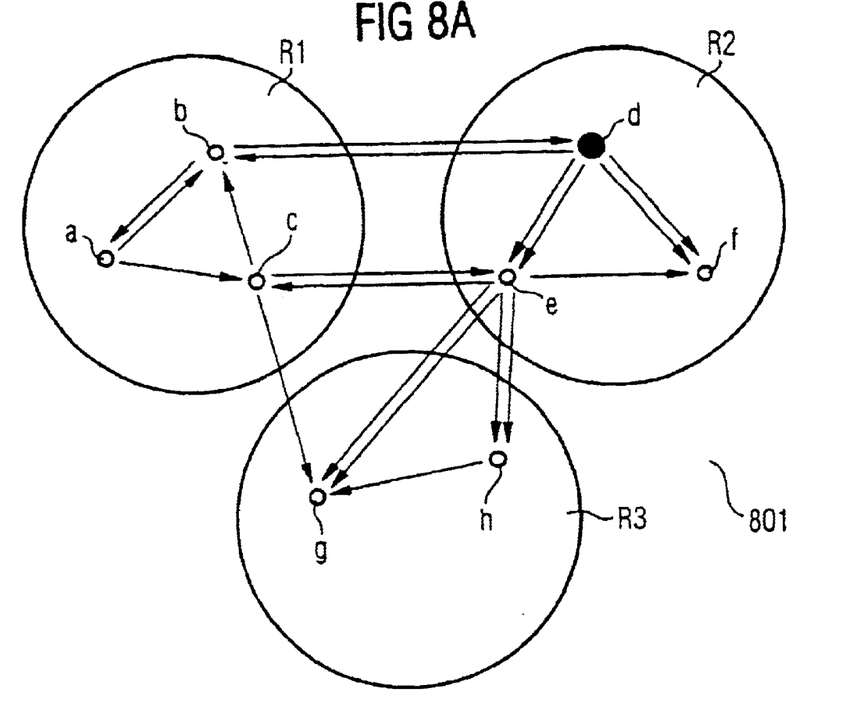
FIGS. 8a and 8b are a graph having a tree of shortest paths proceeding from the node d (FIG. 8a) and a table of the appertaining marking of the nodes with respect to the respective edges of the graph in the region 2 (FIG. 8b)
Figure 8B:
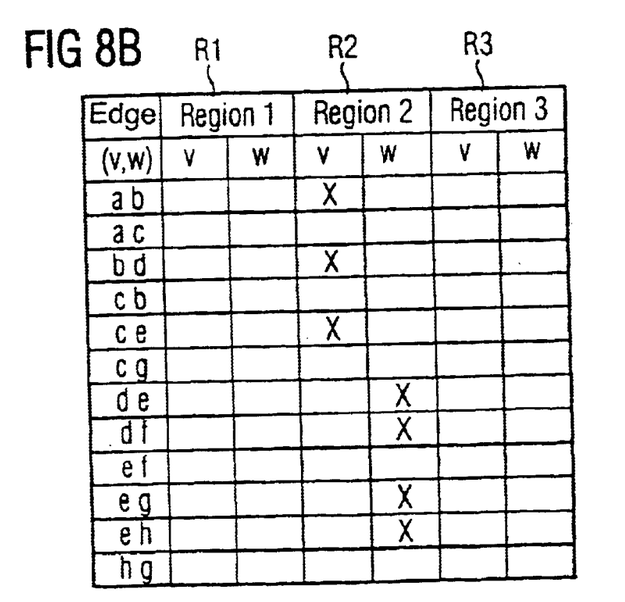

FIG. 8a shows a tree of shortest paths 801 having the root node d in the second region R2. FIG. 8b shows the markings for the second region R2 in the corresponding table.

Figure 9A:
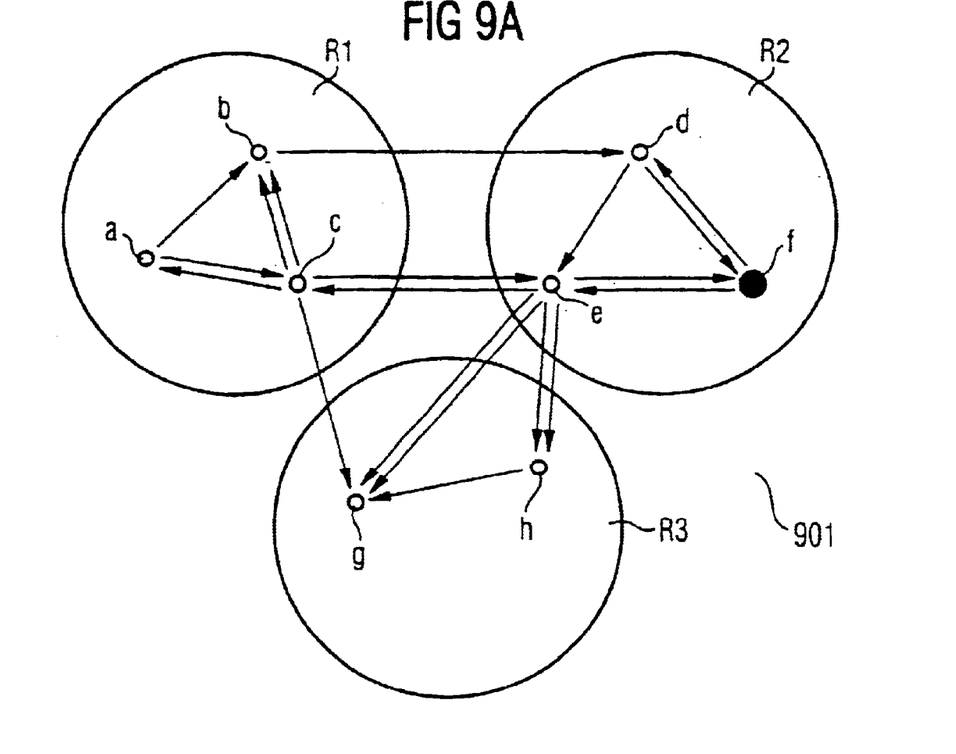
FIGS. 9a and 9b are a graph having a tree of shortest paths proceeding from the node f (FIG. 9a) and a table of the appertaining marking of the nodes with respect to the respective edges of the graph in the region 2 (FIG. 9b)
Figure 9B:
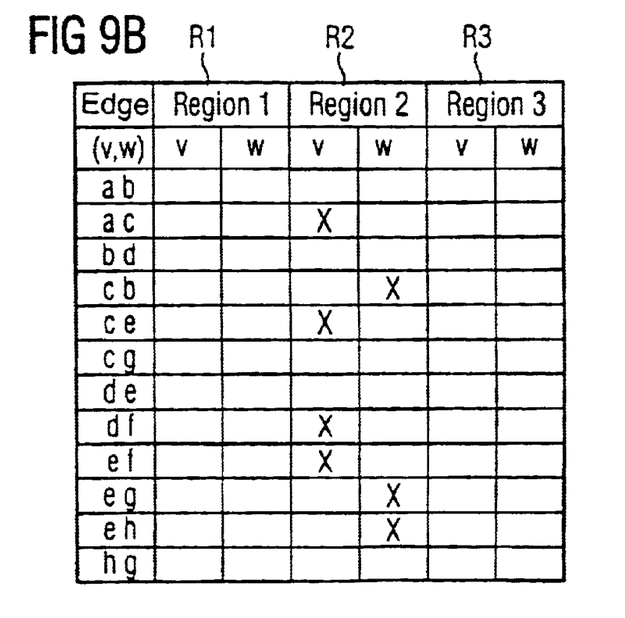

A tree of shortest paths 901 with the root node f is shown in FIG. 9a, and the corresponding table according to the above-described method is shown in FIG. 9b.

Figure 10A:
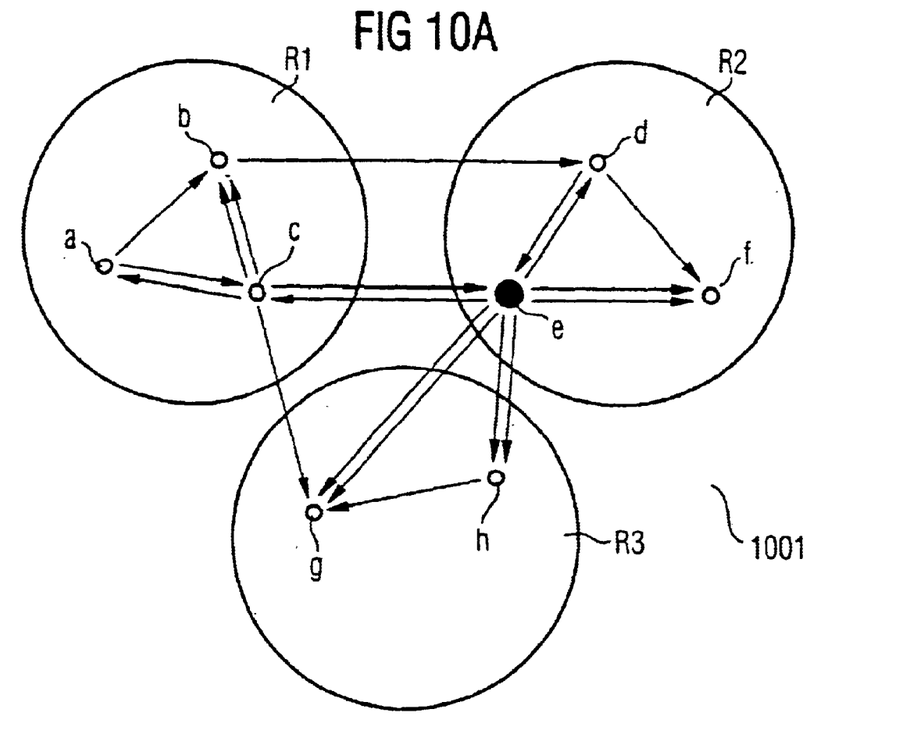
FIGS. 10a and 10b are a graph having a tree of shortest paths proceeding from the node e (FIG. 10a) and a table of the appertaining marking of the nodes with respect to the respective edges of the graph in the region 2 (FIG. 10b)
Figure 10B:
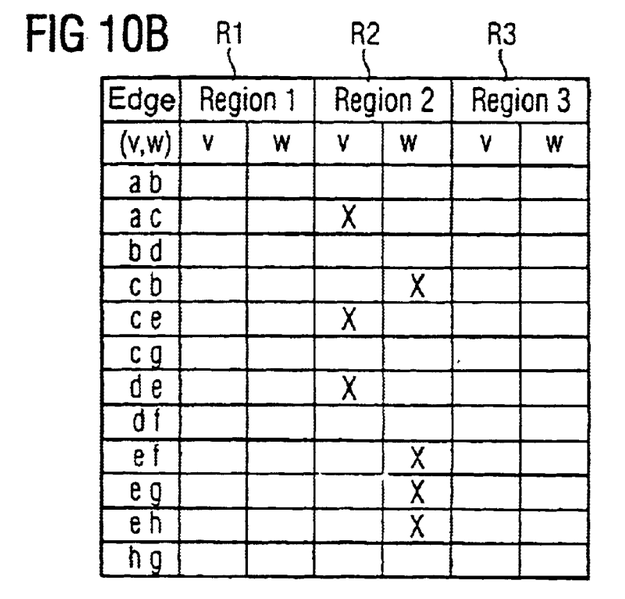

FIG. 10a shows a tree of shortest paths 1001 with the root node e, and FIG. 10b shows the table appertaining to the tree of shortest paths 1001 with the root node f.

Figure 11A:
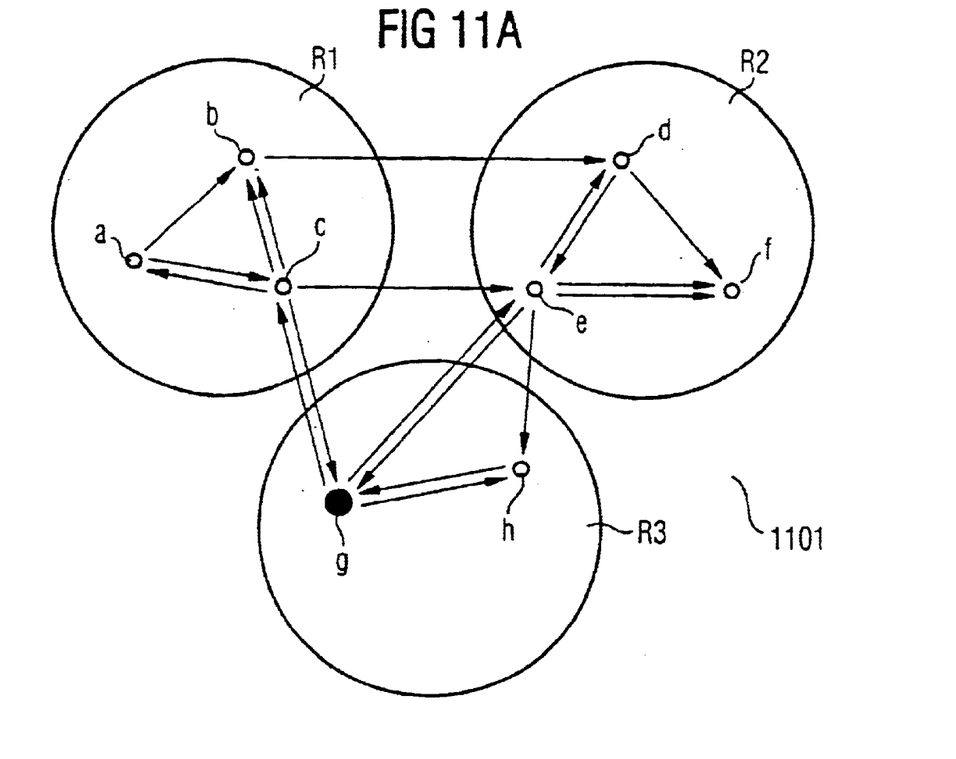
FIGS. 11a and 11b are a graph having a tree of shortest paths proceeding from the node g (FIG. 11a) and a table of the appertaining marking of the nodes with respect to the respective edges of the graph in the region 3 (FIG. 11b;)
Figure 11B:
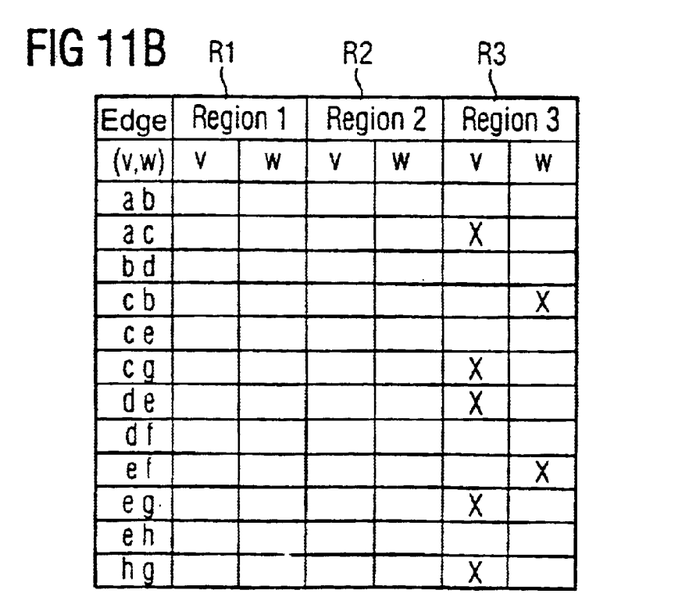

FIG. 11a shows a tree of shortest paths 1101 with the root node g, and FIG. 11b shows the resulting table for the third region R3 and the tree of shortest paths 1101 with the root node g.

Figure 12A:
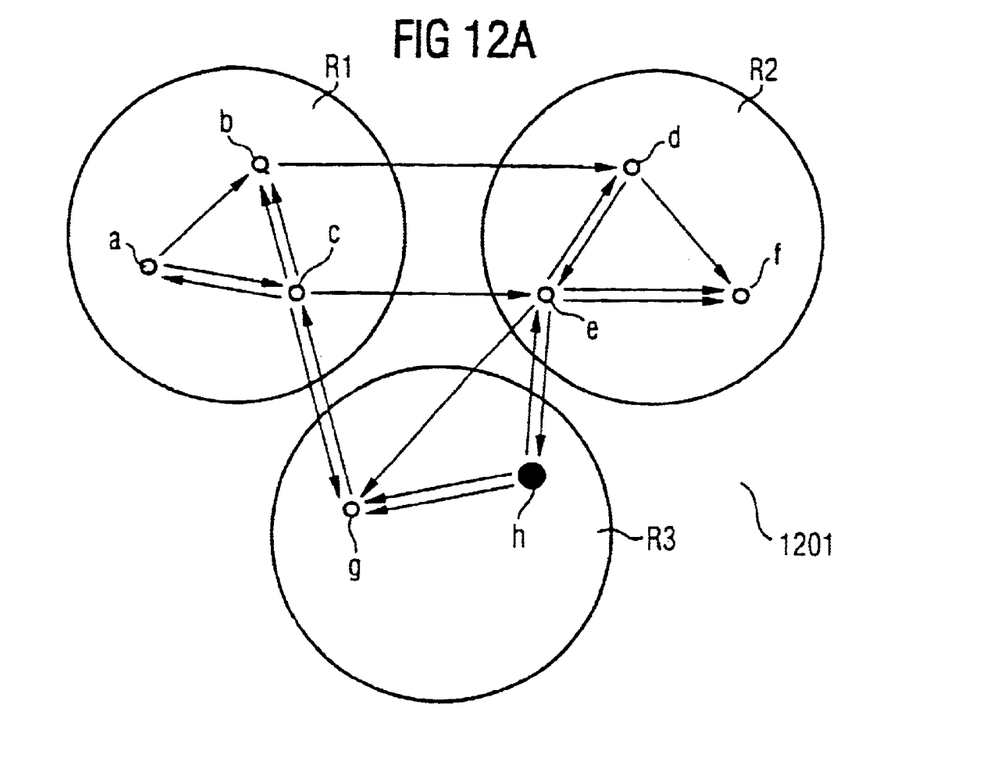
FIGS. 12a and 12b are a graph having a tree of shortest paths proceeding from the node h (FIG. 12a) and a table of the appertaining marking of the nodes with respect to the respective edges of the graph in the region 3 (FIG. 12b)
Figure 12B:
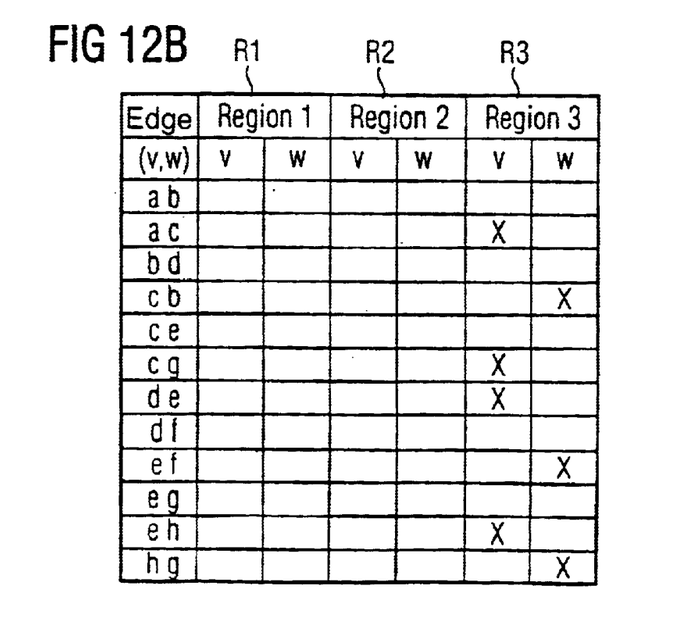

FIG. 12a shows a tree of shortest paths 1201 with root node h, and FIG. 12b shows the table that derives according to the above-described method for the tree of shortest paths 1201 with the root node h and the third region R3.

Figure 13B:
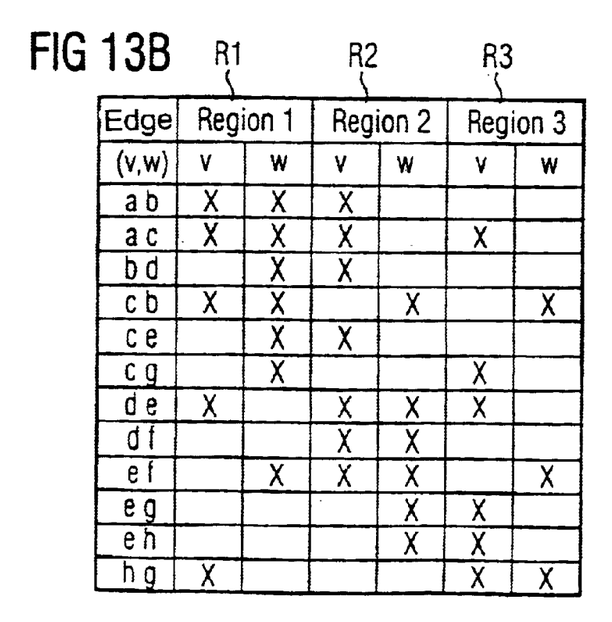

FIG. 13b shows an overall table that derives and wherein all marked nodes for the respective edge and the respective region are combined according to a logical OR operation of all tables that are shown in FIGS. 5b, 6b, 7b, 8b, 9b, 10b, 11b, 12b.

The pre-processing is terminated with the stored, overall table of the marked edges (v, w) of the Graph 1301.

Any known algorithm for calculating the shortest paths can be utilized for the actual calculation of the shortest paths in an application.

The following modifications are merely provided:

An appertaining start region is in which the start node lies and target region $i_t$ in which the target node lies is determined for the prescribed starting node and the prescribed target node. Only those edges (v, w) for which the edge values vflag[$i_t$] and wflag[$i_s$] are marked with the first binary value are taken into consideration in the calculation of the shortest path proceeding from the starting node.

Graphically described, the path searches thus spread extremely target-directed from the starting node onto the target region $i_d$ and only fan out more broadly in the proximity of the target region $i_t$.

A few modifications of the above-described exemplary embodiment are presented below.

A bidirectional search can be simultaneously utilized proceeding from the starting node and from the target node. In this way, the fanning in the proximity of the target region $i_r$ is eliminated, and it is nearly only the nodes that lie in the shortest path that are investigated.

Figure 4:
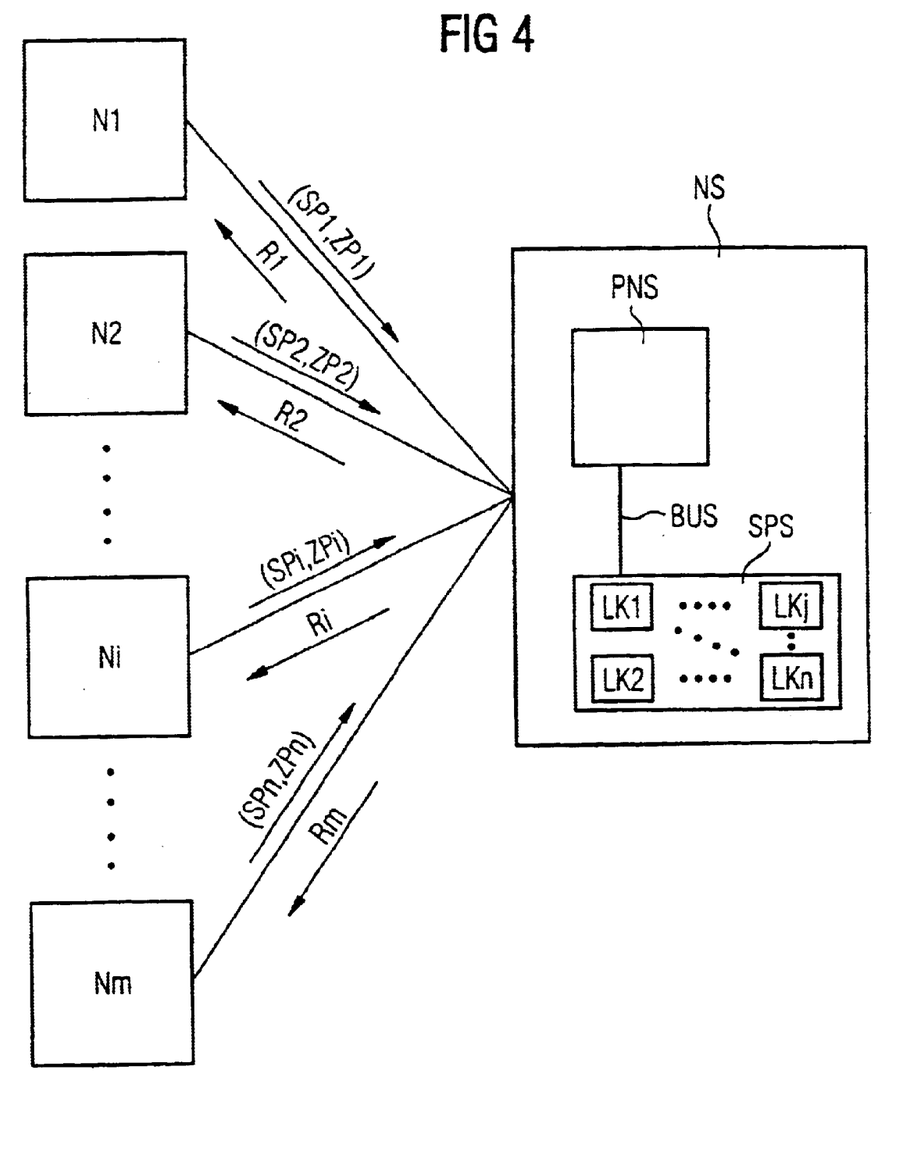
FIG. 4 is a block diagram showing a plurality of navigation systems and a navigation server to which a plurality of inquires are supplied and for which the server respectively determines a route having the shortest path between the indicated starting positions or, respectively, target positions.

The invention can also be utilized in a centralized system having a plurality of navigation systems Ni (i=1 . . . m) and a navigation system server NS (see FIG. 4). The navigation system server NS comprises a processor PNS of the navigation system server NS as well as a memory SPS with the stored maps LKj, whereby the memory SPS is coupled to the processor PNS of the navigation system server NS.

Inquiries for determining shortest paths are supplied to the navigation system server NS by the navigation systems Ni. Each inquiry contains particular information about the desired starting position SPi and the desired target position ZPi for which the route is to be identified. The determination of shortest paths as well as the pre-processing is implemented in the navigation system server NS, and the optimum root Ri that contains the edges of the shortest paths is communicated to the respective navigation system Ni in a reply message Ri from the navigation system server NS.

It is thereby to be noted that the pre-processing is implemented only once or—if it is to react to modified traffic situations (traffic jams, blocked streets, etc.)—is implemented at regular intervals.

It should be pointed out that all edges in the respective graph are undirected in the exemplary embodiment. The arrows at the edges merely indicate an arbitrary target direction. The invention can be utilized without further ado given directed or partially directed graphs, for example in a street network having one-way streets.

Although other modifications and changes may be suggested by those skilled in the art, it is the intention of the inventors to embody within the patent warranted hereon all changes and modifications as reasonably and properly come within the scope of their contribution to the art.

We claim:

1. A method for computer-assisted processing of a graph that includes nodes and edges, whereby the graph describes a structure of a technical system, comprising the steps of:
    grouping the nodes into at least two regions,
    implementing the following steps for each of said at least two regions and for at least some of the nodes of the region;
        a) selecting one node as a root node;
        b) determining a tree of shortest paths for the root node in the graph with the root node as a root of the tree; and
        c) marking a node of an edge of the graph for the region when the edge is contained in a shortest path to the root node proceeding from the node to the root node.

2. A method according to claim 1 further comprising:
    implementing the method steps a) through c) for all nodes of the region.

3. A method according to claim 1, wherein the marking step ensues by allocating a binary value to the node in the edge of the region.

4. A method according to claim 1, wherein the grouping step groups the nodes into at least three regions.

5. A method according to claim 1, further comprising the step of:
    determining a shortest path between a predetermined starting node and a predetermined target node upon employment of the marked nodes.

6. A method according to claim 5, wherein said determining of said shortest path step includes:
    determining and storing a starting region, the starting node being grouped to said starting region;
    determining and storing a target region, the target node being grouped to said target region;
    taking only those edges into consideration in the determination of the shortest path proceeding from the starting node for which the following is valid;
    marking a first node of the edge for the target region proceeding from the starting node in the starting region, and
    marking a second node of the edge for the starting region proceeding from the starting node in the starting region.

7. A method according to claim 6, wherein said determining of said shortest path step includes:
    taking only those edges for which the following applies into consideration in the determination of the shortest path proceeding from the target node:
    marking a first node of the edge for the starting region proceeding from the target node in the target region, and
    marking a second node of the edge for the target region proceeding from the target node in the target region.

8. A method according to claim 1, further comprising the step of:
    utilizing said steps for determining roots between a starting location and a target location of a digitalized map in a computer-assisted navigation system, wherein the content of the map is described by the graphs.

9. A method according to claim 1, wherein said determining steps uses the Moore/Pape method for the determination of a shortest path.

10. An arrangement for computer-assisted processing of a graph that includes nodes and edges, comprising:
    a processor unit that is configured such that
        the nodes are grouped into at least two regions;
        the following steps are implemented for each of said at least two regions and for at least some of the nodes of the region:
            a) one node is selected as a root node;
            b) a tree of shortest paths is determined for the root node in the graph having the root node as a root of the tree;
            c) a node of an edge of the graph is marked for the region when, proceeding from the node to the root node, the edge is contained in a shortest path to the root node.

11. An arrangement according to claim 10, wherein the processor unit is configured such that the method steps a) through c) are implemented for all nodes of the region.

12. An arrangement according to claim 10, wherein the processor unit is configured such that the marking ensues by allocation of a binary value to the node in the edge of the region.

13. An arrangement according to claim 10, wherein the processor unit is configured such that the nodes are grouped into a plurality of regions.

14. An arrangement according to claim 10, wherein the processor unit is configured such that a shortest path between a predetermined starting node and a predetermined target node is determined upon employment of the marked nodes.

15. An arrangement according to claim 14, wherein the processor unit is configured such that the following steps are implemented for determining the shortest path between the starting node and the target node:
- a starting region is determined and stored, the starting node being grouped to the starting region;
- a target region is identified and stored, the target node being grouped to the target region;
- only those edges for which the following applies are taken into consideration in the determination of the shortest path proceeding from the starting node:
  - a first node of the edge is marked for the target region proceeding from the starting node in the starting region, and
  - a second node of the edge is marked for the starting region proceeding from the starting node in the starting region.

16. An arrangement according to claim 15, wherein the processor unit is configured such that the following steps are implemented for determining the shortest path between the starting node and the target node:
- only those edges for which the following is valid are taken into consideration in the determination of the shortest path proceeding from the target node:
  - a first node of the edge is marked for the starting region proceeding from the target node in the target region, and
  - a second node of the edge is marked for the target region proceeding from the target node in the target region.

17. An arrangement for determining a shortest path between a starting node and a target node in a graph that includes nodes and edges, the graph describing a structure of a technical system, comprising:
- a processor unit in said arrangement that is configured such that the shortest path is determined upon employment of graphs that are processed according to the following steps:
  - the nodes are grouped into at least two regions;
  - the following steps are implemented for each region and for at least some of the nodes of the region:
    - a) one node is selected as a root node;
    - b) a tree of shortest paths is determined for the root node in the graph having the root node as a root of the tree; and
    - c) a node of an edge of the graph is marked for the region when the edge is contained in a shortest path to the root node proceeding from the node to the root node.

18. An arrangement according to claim 17, wherein a digitalized map is employed, content of the map being described by a graph with nodes and edges;
- the processed graph being employed for determining routes between a starting location and a destination location.

* * * * *